US012381347B2

(12) United States Patent
Lau et al.

(10) Patent No.: US 12,381,347 B2
(45) Date of Patent: Aug. 5, 2025

(54) CABLE CONNECTOR

(71) Applicant: Microsoft Technology Licensing, LLC, Redmond, WA (US)

(72) Inventors: Tung Yuen Lau, Hong Kong (CN); Shuanghu Zhang, Suzhou (CN); Scott G. Loomis, Everett, WA (US); Gavin T McCarter, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 435 days.

(21) Appl. No.: 17/808,257

(22) Filed: Jun. 22, 2022

(65) Prior Publication Data

US 2023/0163502 A1 May 25, 2023

Related U.S. Application Data

(63) Continuation of application No. PCT/CN2021/132983, filed on Nov. 25, 2021.

(51) Int. Cl.
*H01R 12/77* (2011.01)
*H01R 12/52* (2011.01)
(Continued)

(52) U.S. Cl.
CPC ........... *H01R 12/777* (2013.01); *H01R 12/52* (2013.01); *H01R 12/707* (2013.01); *H01R 12/72* (2013.01); *H01R 24/60* (2013.01)

(58) Field of Classification Search
CPC .... H01R 12/777; H01R 12/52; H01R 12/707; H01R 12/72; H01R 24/60; H01R 12/7011; H01R 12/62
(Continued)

(56) References Cited

U.S. PATENT DOCUMENTS 3,278,887 A * 10/1966 Travis .................. H01R 12/778 216/13
3,404,454 A * 10/1968 Sayles .................. H02G 1/1287 264/254
(Continued)

FOREIGN PATENT DOCUMENTS

| | | | |
|---|---|---|---|
| CN | 204835065 | U | 12/2015 |
| CN | 109413852 | A | 3/2019 |
| TW | 201739111 | A | 11/2017 |

OTHER PUBLICATIONS

"International Search Report and Written Opinion Issued in PCT Application No. PCT/CN21/132983", Mailed Date: Jul. 4, 2022, 19 Pages.
(Continued)

*Primary Examiner* — Alexander Gilman
(74) *Attorney, Agent, or Firm* — Alleman Hall & Tuttle LLP

(57) ABSTRACT

Examples are disclosed relating to cable connectors for attachment to a printed circuit board (PCB). In one example, a cable connector comprises a flexible printed circuit (FPC) comprising a plurality of FPC alignment apertures, a stiffener plate comprising a plurality of stiffener alignment apertures, and a plurality of alignment pins extending through the plurality of stiffener alignment apertures and the plurality of FPC alignment apertures and into a plurality of PCB apertures in the PCB. The plurality of alignment pins align the FPC to the PCB.

20 Claims, 6 Drawing Sheets

(51) Int. Cl.
*H01R 12/70* (2011.01)
*H01R 12/72* (2011.01)
*H01R 24/60* (2011.01)

(58) Field of Classification Search
USPC .......................................................... 439/260
See application file for complete search history.

(56) References Cited

U.S. PATENT DOCUMENTS 3,522,652 A * 8/1970 Herman ................. H01R 43/24 264/272.17
3,550,066 A * 12/1970 Edwin .................. H01R 12/777 439/494
3,573,719 A * 4/1971 Lightner .............. H01R 12/777 439/494
3,638,164 A * 1/1972 Glance ................... H01R 13/28 439/496
4,871,319 A * 10/1989 Babow ................... H01R 12/62 439/495
5,038,467 A * 8/1991 Murphy ................. H01R 12/52 439/852
5,083,939 A * 1/1992 Ittah ..................... H01R 12/777 439/496
6,235,995 B1 * 5/2001 Cheng .................... H05K 1/024 174/250
6,302,705 B1 * 10/2001 Yatskov ................. H05K 1/148 439/67
6,578,260 B1 * 6/2003 Dixon .................... H01R 12/52 29/830
6,612,851 B1 * 9/2003 Goodwin ............... H01R 12/52 439/67
6,743,045 B1 * 6/2004 Hayashi ................. H01R 12/79 439/495
6,832,934 B1 * 12/2004 Zhang ................ H01R 12/7011 439/660
6,935,868 B1 * 8/2005 Campini ................. G06F 1/186 361/748
7,322,833 B1 * 1/2008 Hakansson ............ H05K 3/365 439/67
7,425,134 B1 * 9/2008 Taylor ................ H01R 13/2414 439/67
7,484,994 B2 * 2/2009 Ko ....................... H01R 12/592 439/495
7,488,200 B2 * 2/2009 Yamamoto ........... H01R 12/732 439/511
8,026,905 B2 * 9/2011 Hamblin ................ H05K 3/361 345/173
9,356,405 B1 * 5/2016 Skagmo ............. H01R 13/5202
9,735,484 B2 * 8/2017 Brubaker ............. H01R 43/205
9,810,422 B2 * 11/2017 Su ............................. G06F 1/18
9,843,125 B2 * 12/2017 Tan ........................ H01R 27/02
10,050,361 B1 * 8/2018 Sechrist ................. H01R 12/62
10,594,100 B1 * 3/2020 Namihisa ............... H01R 12/62
10,931,052 B2 * 2/2021 Amini .................. H01R 13/405
2002/0123259 A1 * 9/2002 Yatskov ................. H01R 12/62 439/329
2004/0077189 A1 * 4/2004 St. John ................. H01R 12/62 439/60
2005/0079772 A1 * 4/2005 DeLessert ............ G01R 1/0416 439/700
2006/0148312 A1 * 7/2006 Huang ................... H01R 12/79 439/527
2007/0212919 A1 * 9/2007 Clayton ............... H01R 12/721 257/E23.098
2007/0264845 A1 * 11/2007 Simonsson ............ H01R 12/62 439/67
2014/0004736 A1 * 1/2014 Chen .................. H01R 13/6461 439/493
2015/0162684 A1 * 6/2015 Amini .................... H01R 12/73 439/660
2015/0171562 A1 * 6/2015 Gao ................... H01R 13/6582 439/607.54
2016/0056583 A1 * 2/2016 Chuang .............. H01R 13/6581 439/676
2016/0240832 A1 * 8/2016 Dressel .................. H01R 12/69
2016/0380372 A1 * 12/2016 Hsieh ..................... H01R 24/60 439/676
2017/0194721 A1 * 7/2017 Fan ........................ H01R 12/57
2017/0271799 A1 * 9/2017 Axelowitz ............. H05K 3/363
2018/0175567 A1 * 6/2018 McCracken ........... H01R 24/60
2018/0287288 A1 * 10/2018 Shah .................... H01R 13/504
2020/0144752 A1 * 5/2020 Liao ................... H01R 13/6272
2021/0044032 A1 * 2/2021 Vuylsteke ................ H01R 9/20
2021/0298173 A1 * 9/2021 Gisby ...................... G01D 5/24
2022/0029328 A1 * 1/2022 Chen .................... H01R 13/648
2023/0163502 A1 * 5/2023 Lau ........................ H01R 12/52 439/495

OTHER PUBLICATIONS

"Invitation to Pay Additional Fees issued in PCT Application No. PCT/CN21/132983", Mailed Date: May 11, 2022, 12 Pages.

* cited by examiner

CABLE CONNECTOR

CROSS REFERENCE TO RELATED APPLICATIONS

This application is a continuation of International Application Serial No. PCT/CN2021/132983, filed Nov. 25, 2021, the entirety of which is hereby incorporated herein by reference for all purposes.

BACKGROUND

Electronic connectors such as plugs and receptacles are widely used to couple one device or component to another device/component or power source. Various types of cable connectors, such as removable plug receptacles, include a flexible printed circuit (FPC) that is mounted to a printed circuit board (PCB) of a device or component using board-to-board connectors and/or other additional connections.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to cable connectors for attachment to a printed circuit board (PCB). In one example, a cable connector comprises a flexible printed circuit (FPC) comprising a plurality of FPC alignment apertures, a stiffener plate comprising a plurality of stiffener alignment apertures, and a plurality of alignment pins extending through the plurality of stiffener alignment apertures and the plurality of FPC alignment apertures and into a plurality of PCB apertures in the PCB. The plurality of alignment pins align the FPC to the PCB.

In another example, a cable connector comprises a tongue that comprises a plurality of first bonding surfaces extending from a proximal end of the tongue to a distal end of the tongue, with the first bonding surfaces affixed to a first ribbon of a flexible printed circuit (FPC). The first tongue surface also includes a plurality of first slots extending between the first bonding surfaces from the proximal end of the tongue to the distal end of the tongue. The tongue also comprises a second tongue surface that is opposite the first tongue surface. The second tongue surface includes a plurality of second bonding surfaces extending from the proximal end of the tongue to the distal end of the tongue, with the second bonding surfaces affixed to a second ribbon of the FPC. The second tongue surface also includes a plurality of second slots extending between the second bonding surfaces from the proximal end of the tongue to the distal end of the tongue.

In another example, a method of attaching a flexible printed circuit (FPC) of a cable connector to a printed circuit board (PCB) is disclosed. The method comprises inserting a plurality of alignment pins through a plurality of stiffener alignment apertures in a stiffener plate and a plurality of FPC alignment apertures in the FPC. The alignment pins are then affixed to the stiffener plate. The alignment pins are inserted into a plurality of PCB apertures in the PCB, and two or more alignment pins are then affixed to the PCB.

DETAILED DESCRIPTION

As noted above, many receptacles for removable plugs and other cable connectors utilize a flexible printed circuit (FPC) that is mounted to a printed circuit board (PCB) of a device using board-to-board connectors and/or other additional connections. The footprints, thicknesses, and overall sizes of these configurations can be too large to be accommodated in certain electronic devices having smaller profiles, such as foldable computing devices. Also, to accurately position the FPC relative to the PCB for attachment, these configurations require specialized alignment equipment and imaging systems to ensure proper alignment between the FPC and PCB.

The numerous connections utilized in these configurations also can cause poor signal integrity and create multiple hotspots that necessitate additional electromagnetic shielding components that further increase size and cost. In many of these configurations, repeated insertion and removal of a corresponding plug into the connector also can cause delamination of the FPC from its underlying support surface.

Accordingly, the present disclosure describes cable connectors and related methods that address one or more of the above-described issues. As described in more detail below, cable connectors of the present disclosure include one or more features that reduce the overall size and footprint of an FPC to PCB connection, and eliminate the need for board-to-board connections and/or other additional connections. Configurations of the present disclosure also provide more robust electromagnetic shielding and corresponding improved signal integrity as compared to prior configurations. Additionally, cable connectors described herein utilize alignment pins that eliminate the need for specialized alignment equipment and imaging systems to ensure proper alignment between the FPC and PCB. As described further below, the cable connectors also include features that promote structural integrity of the FPC and protect the FPC from delamination.

Figure 1:
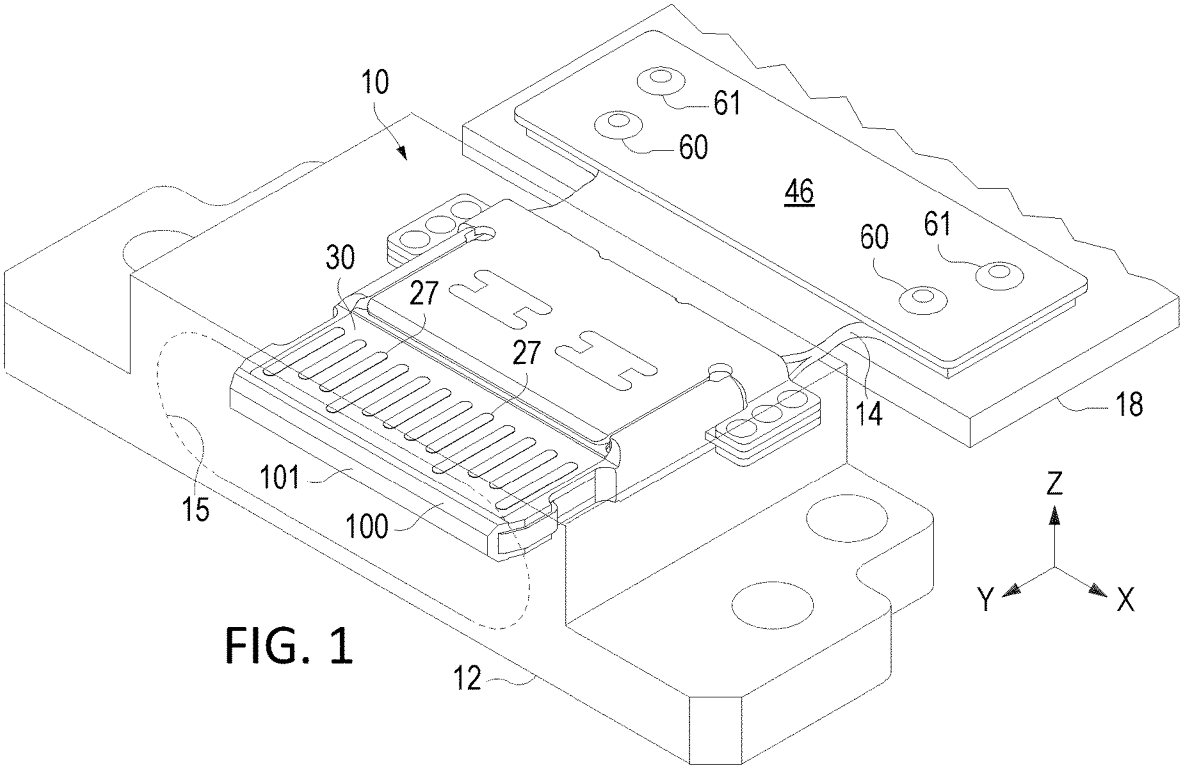
FIG. 1 shows one example of a cable connector affixed to a PCB according to examples of the present disclosure.
Figure 2:
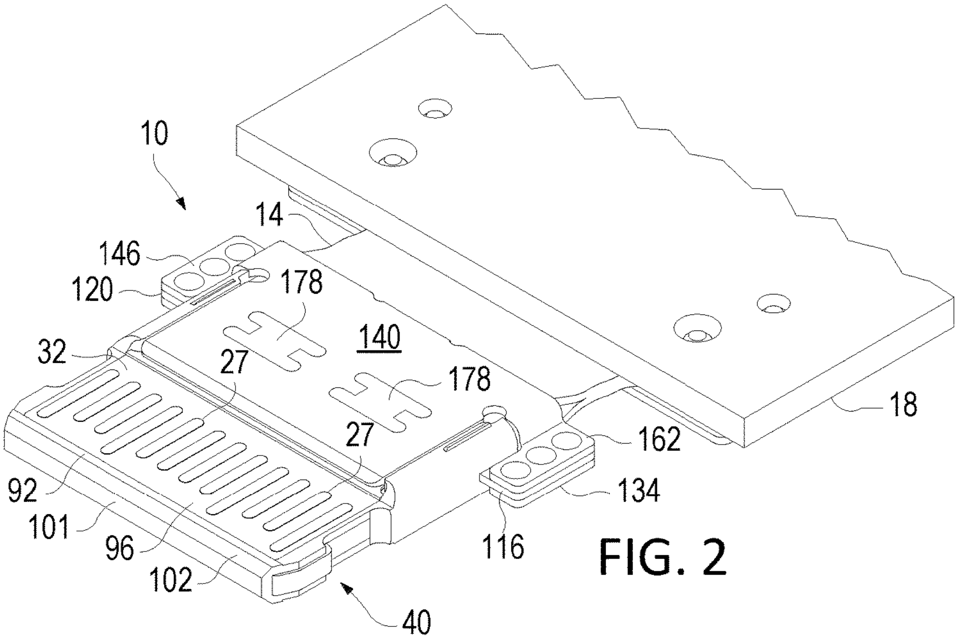
FIG. 2 shows an opposite side view of the cable connector and PCB according to examples of the present disclosure.

FIGS. 1 and 2 show one example of a cable connector 10 according to examples of the present disclosure. As shown in FIG. 1, portions of the cable connector 10 are housed in a receptacle 12 (shown in dashed line for clarity) that is configured to removably receive a corresponding plug for attachment to and detachment from the cable connector via frictional engagement. As described in more detail below, and with reference also to FIGS. 3 and 4, the cable connector 10 includes an FPC 14 that comprises a distal end 16 affixed to a PCB 18 and an opposing proximal end 20. The distal end 16 of the FPC 14 comprises a plurality of conductors 24 configured to electrically contact corresponding conductors 26 on the PCB 18.

In the present example, the cable connector 10 takes the form of a rotationally symmetrical USB-C connector that utilizes a 24-pin connector system consisting of twelve pins (conductors) 27 on each side of a tongue 40. In other examples, one or more aspects of the present disclosure may be utilized in cable connectors that have different pin configurations, conform to different industry standards, are rotationally symmetrical or asymmetrical, and/or have other features that differ from the examples described herein.

Figure 5:
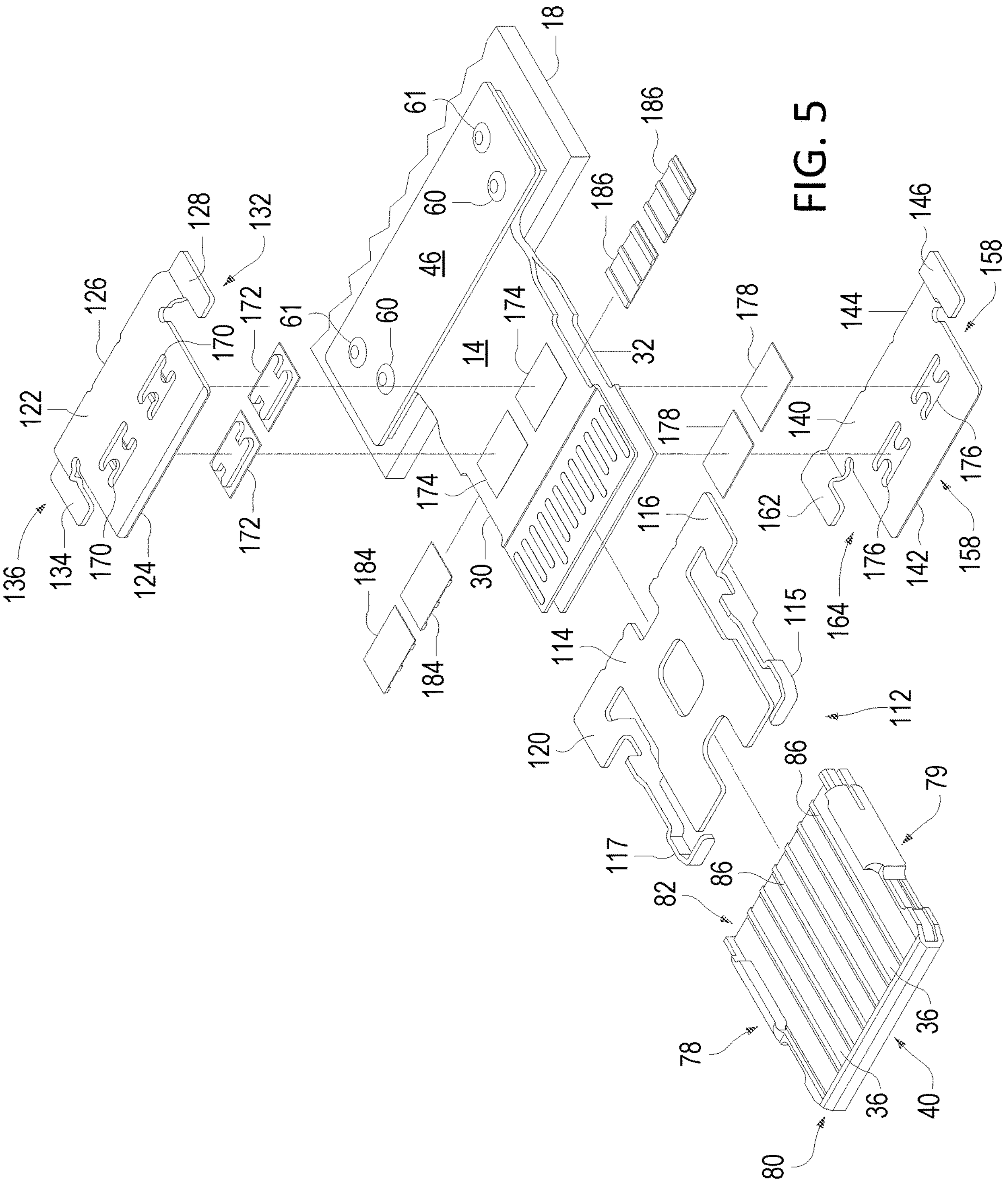
FIG. 5 shows an exploded view of a tongue, midplate, and collar plates of the cable connector according to examples of the present disclosure.
Figure 6:
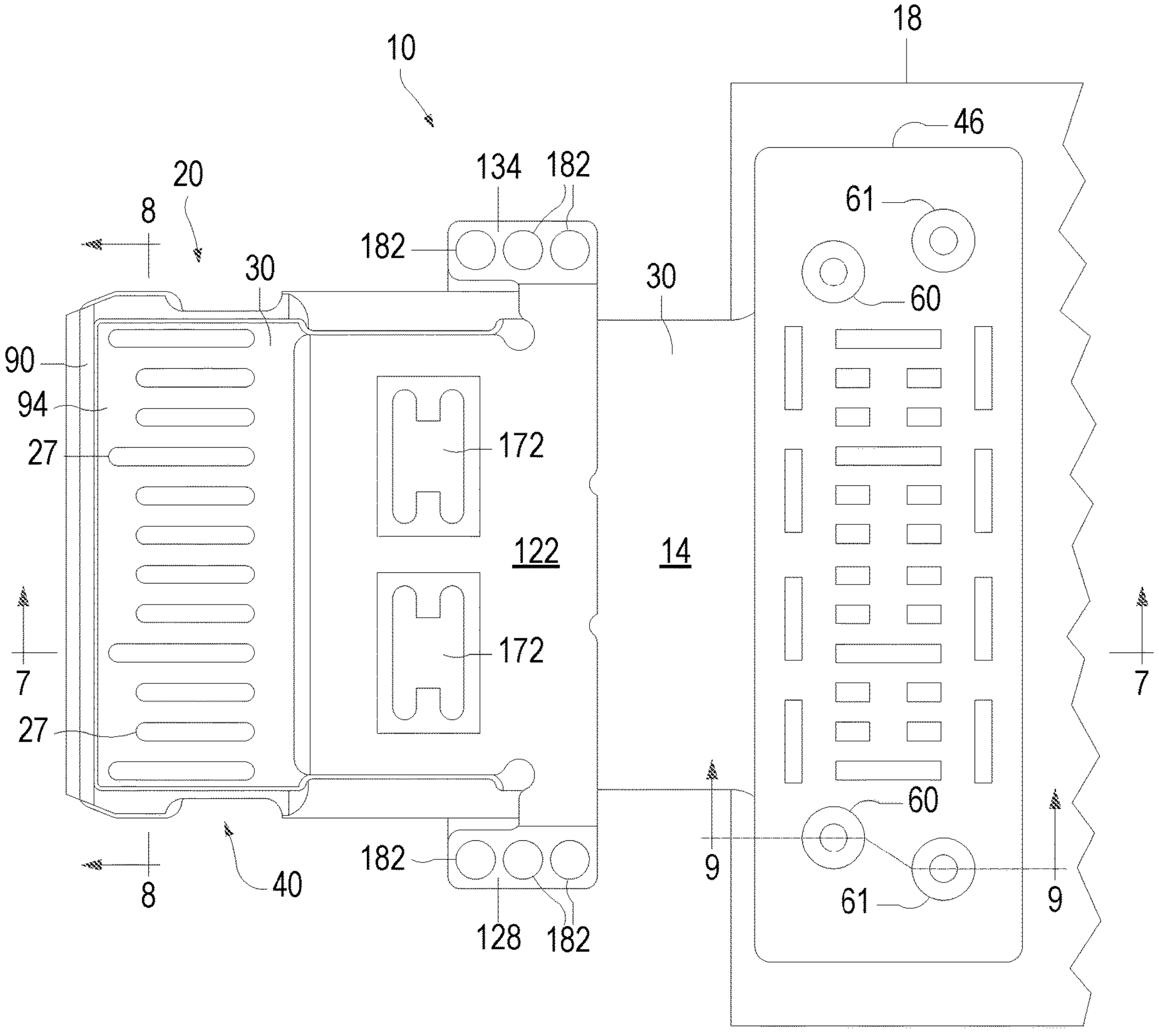
FIG. 6 shows a top view of the cable connector and stiffener plate according to examples of the present disclosure.
Figure 7:
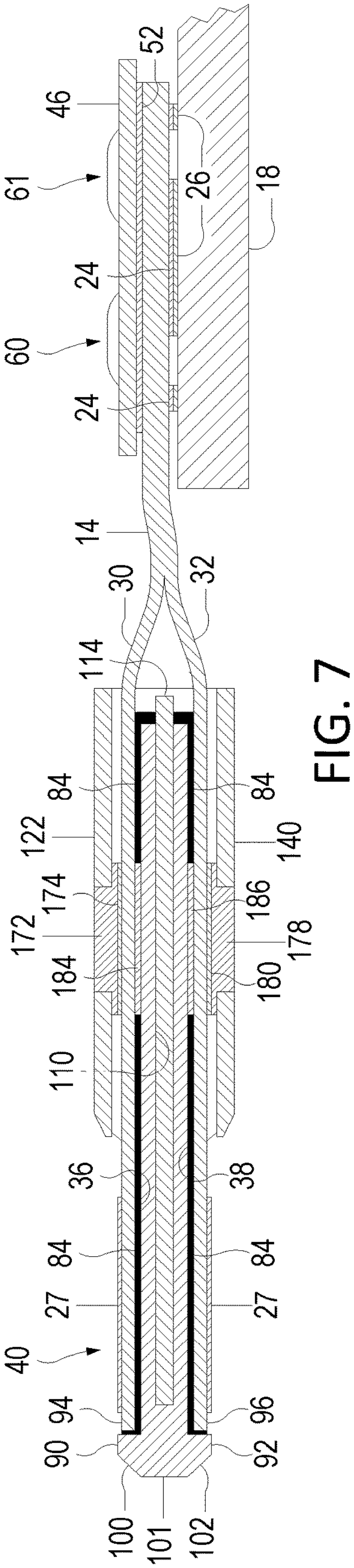
FIG. 7 shows a cross section view of the cable connector taken along line 7-7 in FIG. 6 according to examples of the present disclosure.

With reference now to FIGS. 5 and 7, in the present example the FPC 14 comprises a single ribbon at the distal end 16 that is affixed to the PCB 18. Moving toward the proximal end 20 the FPC 14 splits into a first ribbon 30 and an opposing second ribbon 32 that extend parallel to one another and away from the distal end 16. As described in more detail below, the first ribbon 30 is affixed to a plurality of first bonding surfaces 36 of a tongue 40 of the cable connector 10 and the second ribbon 32 is affixed to a plurality of second bonding surfaces 38 of the tongue opposite to the first bonding surfaces.

Accordingly, and in one potential advantage of the present disclosure, this configuration utilizing an FPC 14 that splits into a first ribbon 30 and second ribbon 32 provides a board mount connector that allows for variations in Z height differences between mounting surfaces on a PCB and connector ports of a device's housing, such as port 15 of receptacle 12 in FIG. 1. Accordingly, cable connectors 10 of the present disclosure provide flexibility to be used across different devices without the need to redesign the connector.

Figure 4:
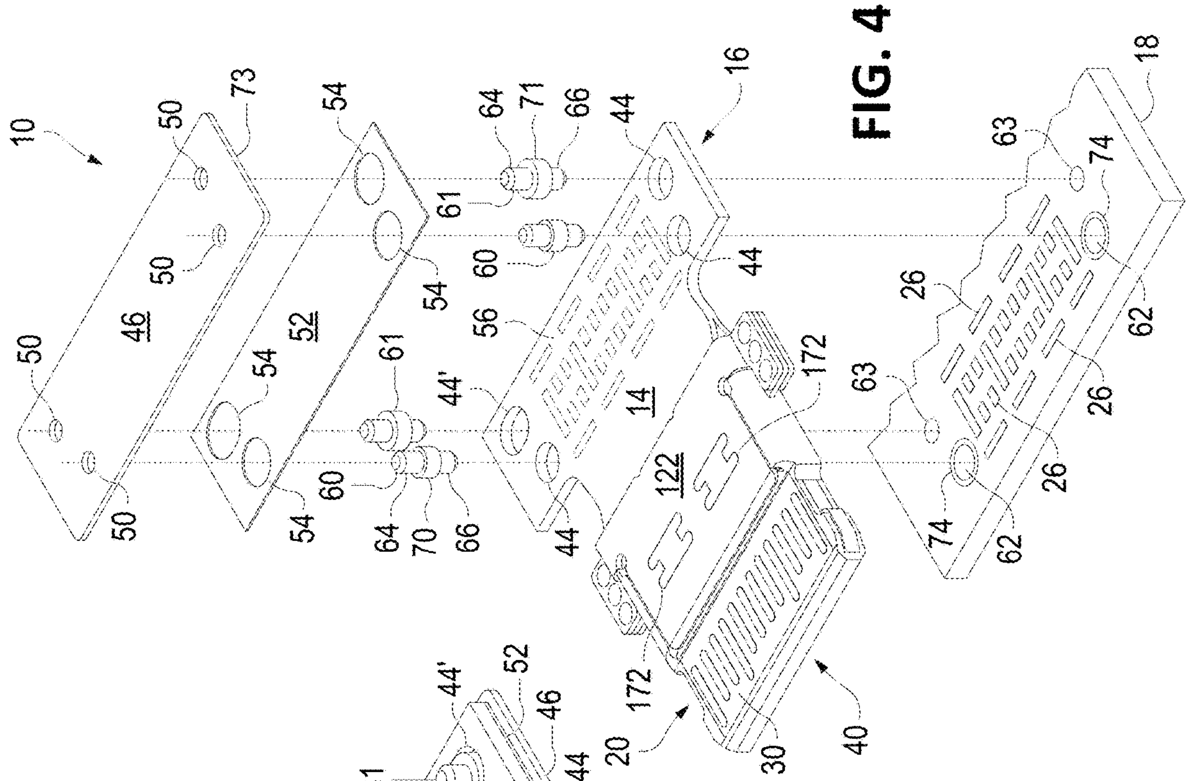
FIG. 4 shows an exploded view of the cable connector and a portion of the PCB according to examples of the present disclosure.

With reference now to FIG. 4, as described in more detail below and in another potential advantage of the present disclosure, the FPC 14 comprises a plurality of FPC alignment apertures 44, 44' at the distal end 16 of the FPC. A structural stiffener plate 46 comprising a plurality of stiffener alignment apertures 50 is bonded to a non-contacting surface 56 of the FPC 14 via an adhesive layer 52. In different examples the adhesive layer 52 can comprise a pressure sensitive adhesive, heat-activated film, epoxy glue, or other suitable adhesive. In some examples the adhesive layer 52 is conductive. Advantageously, in these examples a conductive adhesive layer 52 can enable the stiffener plate to provide robust electromagnetic shielding as described further below. The adhesive layer 52 includes corresponding apertures 54 that are aligned with the stiffener alignment apertures 50. As described further below, and in one potential advantage of the present disclosure, a plurality of alignment pins 60 and 61 extend through the plurality of stiffener alignment apertures 50 and the plurality of FPC alignment apertures 44, 44' and into a plurality of PCB apertures 62, 63 in the PCB 18. As described in more detail below, the alignment pins 60, 61 perform numerous technical functions, including aligning the stiffener plate to the FPC and aligning the FPC to the PCB. Additionally, adhesive layer apertures 54 are significantly larger than the diameters of the alignment pins 60 and 61 and larger than the FPC alignment apertures 44, 44' and the stiffener alignment apertures 50. Advantageously, the relatively larger size of the apertures 54 provides surface area on the structural stiffener plate 46 and non-contacting surface 56 of the FPC 14 to accommodate potential adhesive spread-out during bonding.

Advantageously and as described further below, the alignment pins 60, 61 and corresponding stiffener alignment apertures 50 and FPC alignment apertures 44, 44' cooperate to align the stiffener plate 46 with the FPC 14 and create a structurally robust FPC assembly. Additionally, the alignment pins 60, 61 and corresponding FPC apertures 44, 44' and PCB apertures 62 function to align the FPC 14 and stiffener plate 46 to the PCB 18 for accurate engagement of the FPC conductors 24 with the corresponding PCB conductors 26. In this manner, and in one potential advantage of the present disclosure, proper alignment between the FPC 14 and PCB 18 is achieved without the need for specialized alignment equipment and imaging systems.

Additionally, and as described in more detail below, these components for aligning, mounting, and attaching the FPC 14 to the PCB 18 eliminate the need for board-to-board connectors. For example, the exemplary configurations described below function to attach the FPC 14 to the PCB 18 via the stiffener plate 46. In this manner, configurations of the present disclosure enable thinner and lower-profile FPC/PCB stackups and smaller overall footprints, while also providing desirable flexibility in Z height differences between PCB mounting surfaces and the connector ports of a device's housing or other ports or components.

Figure 9:
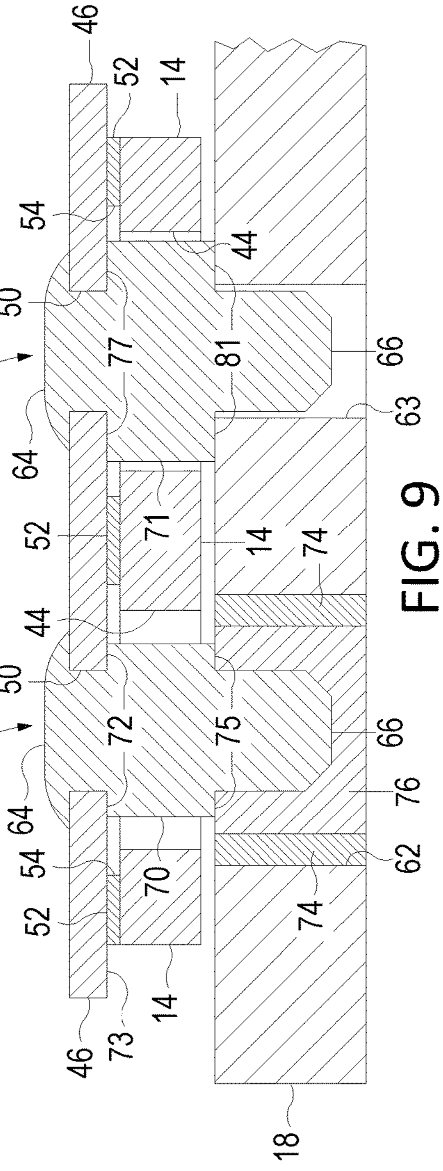
FIG. 9 shows a cross section view of the cable connector taken along line 9-9 in FIG. 6 according to examples of the present disclosure.

With reference to FIGS. 4 and 9, each alignment pin 60, 61 comprises a tail end 64 and opposing head end 66. After each alignment pin 60, 61 is inserted through the stiffener alignment apertures 50, the adhesive layer apertures 54, and the FPC alignment apertures 44, 44', the tail end 64 of each pin is affixed to the stiffener plate 46. In the present example, each tail end 64 is riveted to the stiffener plate 46. Advantageously, in addition to creating a strong mechanical bond between the alignment pins 60, 61 and the stiffener plate 46, riveting each tail end 64 to the stiffener plate 46 also creates solid electrical contact between the alignment pins and the stiffener plate, which thereby enables the stiffener plate to provide robust electromagnetic shielding as described further below. In other examples, different configurations of alignment pins may be utilized and affixed to the stiffener plate 46 in any suitable manner.

With continued reference to FIG. 9, each alignment pin 60 comprises a first standoff feature 70 between the tail end 64 and head end 66. The first standoff feature 70 comprises a first upper shoulder 72 that engages a lower surface 73 of the stiffener plate 46, and a first lower shoulder 75. Similarly, each alignment pin 61 comprises a second standoff feature 71 between the tail end 64 and head end 66. The second standoff feature 71 comprises a second upper shoulder 77 that engages the lower surface 73 of the stiffener plate 46, and a second lower shoulder 81.

In some examples, prior to insertion and deformation, the tail end 64 of each alignment pin 60, 61 is inserted through the FPC alignment apertures 44, 44', the adhesive layer apertures 54, and the stiffener alignment apertures 50 until the first upper shoulders 72 and the second upper shoulders

77 contact the lower surface 73 of the stiffener plate 46. Advantageously, by bracing the first upper shoulders 72 and the second upper shoulders 77 of the alignment pins 60, 61 against the lower surface 73 of the stiffener plate 46, the first lower shoulders 75 and second lower shoulder 81 may then be utilized as working surfaces for a riveting machine or tool that upsets (deforms) the tail end 64 to expand its original diameter as illustrated in FIG. 4 to its wider, deformed diameter shown in FIG. 9.

With the alignment pins 60, 61 riveted to the stiffener plate 46, and in another potential advantage of the present disclosure, the alignment pins are inserted into the PCB apertures 62, 63 to thereby guide and align the conductors 24 of the FPC 14 into mating contact with the corresponding conductors 26 of the PCB 18 (see also FIG. 7). Advantageously and as noted above, this configuration provides and ensures proper alignment between the FPC 14 and PCB 18 without the need for specialized alignment equipment and imaging systems. In some examples and in another potential advantage of the present disclosure, the first standoff feature 70 of alignment pins 60 and second standoff feature 71 of alignment pins 61 also function to set and maintain a gap between the PCB-facing surface of the FPC 14 and the PCB 18 that can facilitate proper contact between the conductors 24 of the FPC 14 and the corresponding conductors 26 of the PCB 18.

In another potential advantage of the present disclosure, the head ends of at least two alignment pins are affixed to the PCB 18 to thereby attach the FPC 14 to the PCB via the stiffener plate 46. In the present example and as shown in FIG. 9, the head end 66 of both alignment pins 60 is soldered to the PCB 18. More particularly, in this example the two PCB apertures 62 comprise plated through holes 74 into which solder 76 is introduced to create a permanent metallic bond between the head end 66 of the alignment pin 60 and the plated through hole. Advantageously, this configuration solidly anchors the FPC 14 to the PCB 18. Additionally, soldering the alignment pins 60 to the PCB 18 electrically connects the grounds of the PCB 18 to the stiffener plate 46, and operates to complete at least a partial Faraday cage around the SMT areas of the FPC 14 that can advantageously block electromagnetic interference. Further, soldering the alignment pins 60 to the PCB 18 also enables stiffener plate 46 to function as a protective bracket that helps anchor the FPC 14 to the PCB 18 and prevents delamination of the soldering areas.

While the present example utilizes two alignment pins 60 and two alignment pins 61, in other examples different numbers, combinations, and/or configurations of alignment pins may be utilized.

Figure 8:
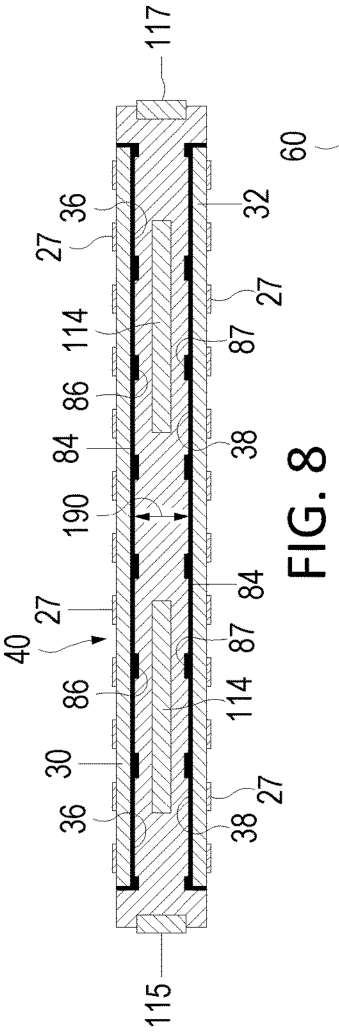
FIG. 8 shows a cross section view of the cable connector taken along line 8-8 in FIG. 6 according to examples of the present disclosure.

As noted above, the FPC 14 comprises a single ribbon at the distal end 16 that is affixed to the PCB 18. The FPC 14 splits into a first ribbon 30 and an opposing second ribbon 32 that extend parallel to one another and away from the distal end 16. With reference now to FIGS. 5, 7, and 8, the first ribbon 30 is affixed via adhesive 84 to a plurality of first bonding surfaces 36 on a first tongue surface 78 of tongue 40. As shown in FIG. 5, the first bonding surfaces 36 extend from a proximal end 80 of the tongue 40 to a distal end 82 of the tongue. Similarly, the second ribbon 32 is affixed via adhesive 84 to a plurality of second bonding surfaces 38 on a second tongue surface 79 of the tongue 40 opposite to the first tongue surface 78. Like the first bonding surfaces 36, the second bonding surfaces 38 extend from the proximal end 80 to the distal end 82 of the tongue 40. In different examples, the tongue 40 may be manufactured from various plastic materials. Additionally, and as described in more detail below, the configurations of the present disclosure allow for a relatively thicker tongue body as compared to prior designs, thereby providing greater structural stability.

In one potential advantage of the present disclosure, and with reference to FIGS. 5 and 8, a plurality of first slots 86 extend between the first bonding surfaces 36 from the proximal end 80 of the tongue 40 to the distal end 82 of the tongue. Similarly, a plurality of second slots 87 extend between the second bonding surfaces 38 from the proximal end 80 of the tongue 40 to the distal end 82 of the tongue. Advantageously, the first slots 86 and second slots 87 function to collect excess and overflow adhesive that can flow from the first bonding surfaces 36 and the second bonding surfaces 38, respectively. In this manner, undesirable buildups and migrations of excess adhesive 84 can be avoided. Additionally, this configuration allows for more variations in the amounts of adhesive 84 that are applied to the first bonding surfaces 36 and the second bonding surfaces 38 without the risk of overflow of adhesive onto contact interfaces or other surfaces.

With reference to FIG. 7, the tongue 40 comprises a first leading surface 90 and opposing second leading surface 92 at the proximal end 80. In another potential advantage of the present disclosure, a first contacting surface 94 of the first ribbon 30 of the FPC 14 is below the first leading surface 90 of the tongue 40. Similarly, a second contacting surface 96 of the second ribbon 32 of the FPC 14 is below the second leading surface 92 of the tongue 40. Advantageously and in this manner, these features prevent a USB-C plug from contacting the first contacting surface 94 of first ribbon 30 and the second contacting surface 96 of second ribbon 32 during insertion/extraction of the plug, which could cause delamination of the first ribbon and second ribbon from the underlying first bonding surfaces 36 and the second bonding surfaces 38 of the tongue 40.

Additionally, the tongue 40 comprises a first angled ramp 100 extending between a nose 101 of the tongue and the first leading surface 90, and a second angled ramp 102 extending between the nose and the second leading surface 92. Advantageously, the first angled ramp 100 and second angled ramp 102 guide the leading edges of a USB-C plug up and over the first leading surface 90 and second leading surface 92 of the tongue 40 to further protect these surfaces from potentially damaging contact.

In another potential advantage of the present disclosure and with reference to FIGS. 5 and 7, the tongue 40 comprises a cavity 110 between the first tongue surface 78 and the second tongue surface 79, and an insert plate 114 of a midplate 112 extends into the cavity. As shown in FIGS. 5 and 7, in this example portions of the insert plate 114 extend from the distal end 82 of the tongue 40 through locations between the pins 27 on the first ribbon 30 and second ribbon 32 of the FPC 14. Advantageously and as described further below, the insert plate 114 cooperates with a first metallic collar plate 122 and a second metallic collar plate 140 to surround significant portions of the first ribbon 30 and second ribbon 32 located behind the exposed pins 27. In this manner, the insert plate 114 cooperates with first collar plate 122 and second collar plate 140 to create a Faraday cage that protects these portions of the first ribbon 30 and second ribbon 32 from electromagnetic interference.

Additionally, as noted above and in another potential advantage of the present disclosure, configurations described herein allow for a relatively thicker tongue body as compared to prior designs that utilize other features, such as numerous clamping features, which reduce the available space into which plastic may be filled. In some examples of the present disclosure, and with reference to FIG. 8, an internal thickness 190 of the tongue 40 between one of the first bonding surfaces 36 and an opposing one of the second bonding surfaces 38 is at least approximately 150 microns. Additionally, utilizing such internal thicknesses of a tongue 40 also expands the material selection possibilities for the tongue to include a variety of thermoplastics having relatively lower flowability and higher scratch resistance. Examples include but are not limited to polyoxymethylene (POM), polyether ether ketone (PEEK), and perfluoroalkoxy alkanes (PFA).

As described in more detail below, and in another potential advantage of the present disclosure, the first collar plate 122 is soldered to the first ribbon 30 of the FPC 14 between a first leading edge 124 and a first trailing edge 126 of the first collar plate, and the second collar plate 140 is soldered to the second ribbon 32 of the FPC 14 between a second leading edge 142 and a second trailing edge 144 of the second collar plate. More particularly and as shown in FIGS. 5 and 7, the first collar plate 122 includes a pair of first solder openings 170 configured to receive first solder joints 172 that bond the first collar plate to first solder pads 174 on the first ribbon 30. Similarly, the second collar plate 140 includes a pair of second solder openings 176 configured to receive second solder joints 178 that bond the second collar plate to second solder pads 180 on the second ribbon 32. Features 184 are part of the first solder pads 174 and features 186 are part of the second solder pads 180.

By soldering the first collar plate 122 and second collar plate 140 to the first ribbon 30 and second ribbon 32, respectively, these collar plates are electrically connected to both ribbons of the FPC. Additionally, this configuration of FPC 14, first collar plate 122, and second collar plate 140 in which middle portions of the collar plates are soldered to the two FPC ribbons provides a larger area for electrical connection of the collar plates to the ground planes of both ribbons as compared to traditional connectors in which such connections are limited to just leading edges of shields. Advantageously, in this manner the present configuration provides a more complete and effective Faraday cage around these portions of the first ribbon 30 and second ribbon 32 of the FPC 14.

As noted above, a midplate 112 includes an insert plate 114 that extends into the cavity 110 in tongue 40. With reference again to FIG. 5, the midplate 112 also includes a first midplate wing 116 extending laterally from the insert plate 114, and an opposing second midplate wing 120 extending laterally from the insert plate. In another potential advantage of the present disclosure, the first collar plate 122 and second collar plate 140 are affixed to the first midplate wing 116 and second midplate wing 120 to provide additional structural integrity and electrical connections between the insert plate 114 and first and second collar plates.

Figure 3:
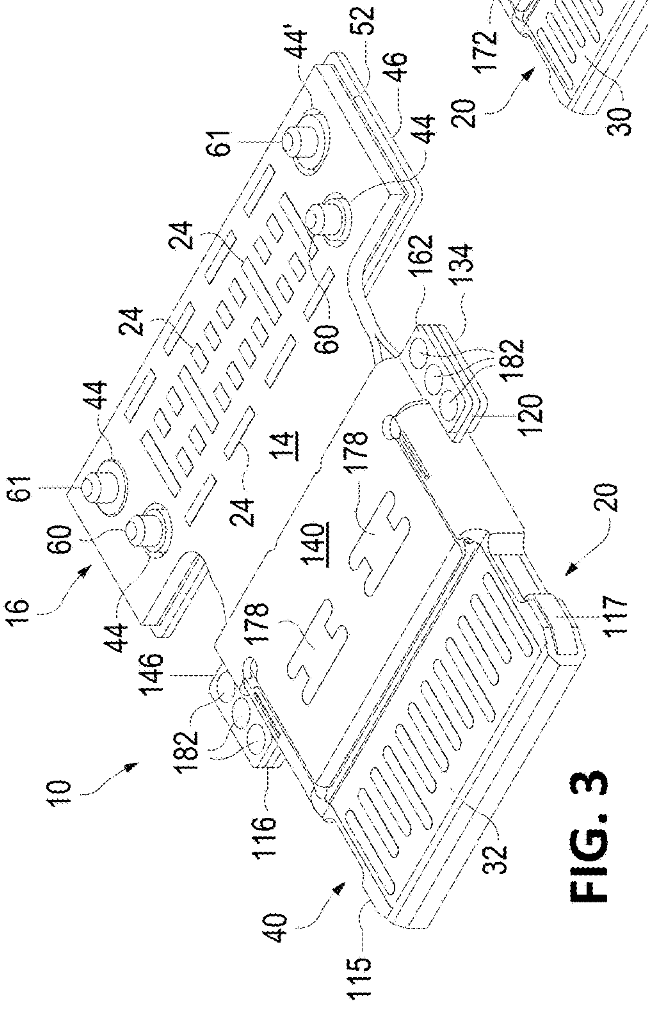
FIG. 3 shows the cable connector of FIG. 2 with the PCB removed according to examples of the present disclosure.

In the present configuration, the first collar plate 122 comprises a first side collar wing 128 extending laterally from a first side 132 of the first collar plate and a second side collar wing 134 extending laterally from a second side 136 of the first collar plate. Similarly, the second collar plate 140 comprises a first side collar wing 146 extending laterally from a first side 158 of the second collar plate and a second side collar wing 162 extending laterally from a second side 164 of the second collar plate. With reference also to FIGS. 2 and 3, the first side collar wings 128, 146 of the first collar plate 122 and the second collar plate 140, respectively, clamp and are affixed to the first midplate wing 116 of the midplate 112. Similarly, the second side collar wings 134, 162 of the first collar plate 122 and the second collar plate 140 clamp and are affixed to the second midplate wing 120 of the midplate 112. In the present example, the first side collar wings 128, 146 and second side collar wings 134, 162 are welded to first midplate wing 116 and second midplate wing 120, respectively, at spot welds 182. In this manner and as noted above, this configuration provides additional structural integrity, physical protection, and electrical connections between the insert plate 114 and first and second collar plates. For example, this configuration can provide a substantially constant clamping force to the first collar plate 122 and second collar plate 140 and can function in combination with the solder joints 172, 178 described above to create robust electrical connections between the collar plates and the insert plate.

Figure 10:
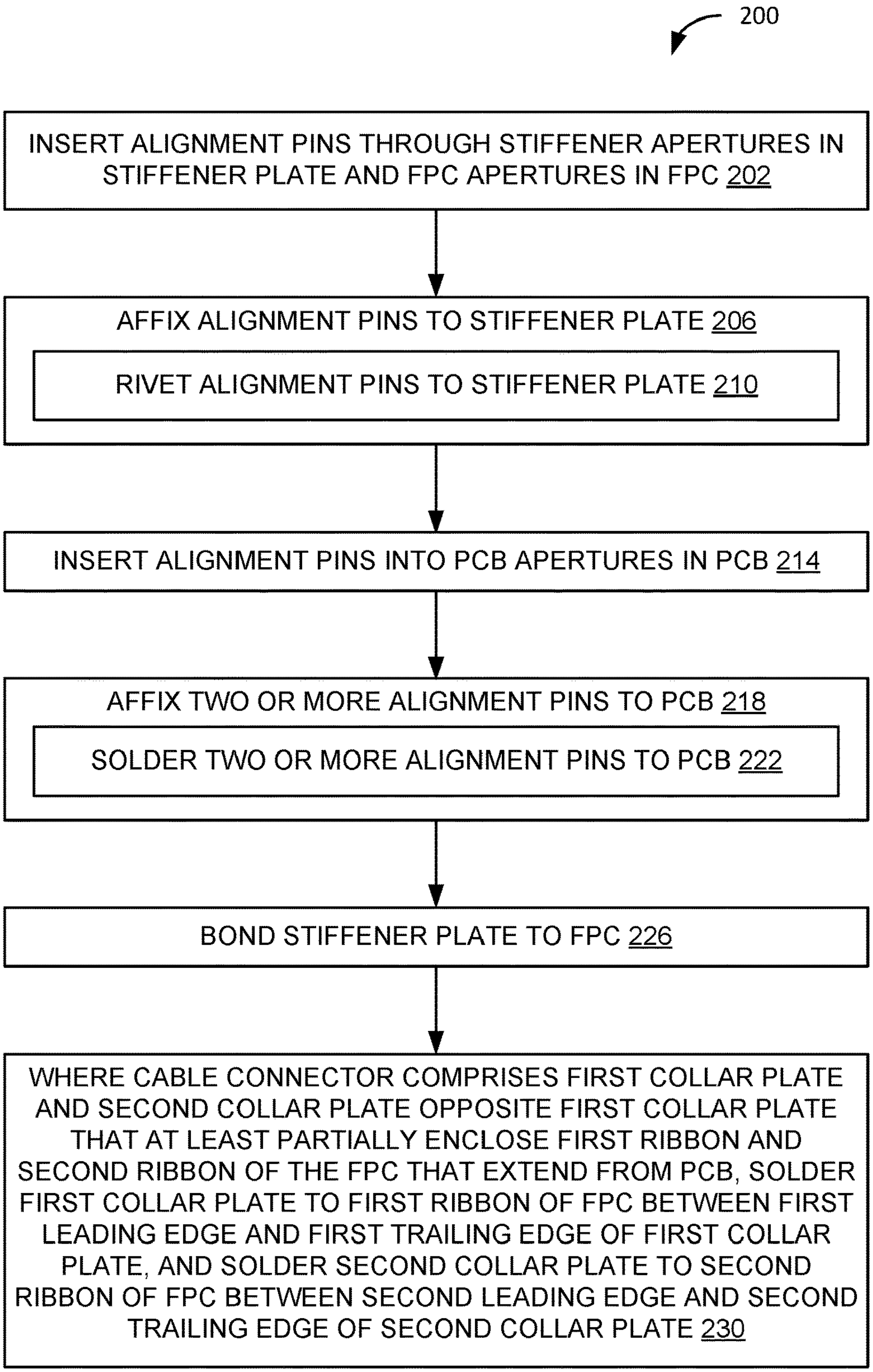
FIG. 10 shows a flow diagram of an example method of attaching an FPC of a cable connector to a PCB according to examples of the present disclosure.

With reference now to FIG. 10, an example method 200 of attaching an FPC of a cable connector to a PCB will now be described. The following description of method 200 is provided with reference to the components described herein and shown in FIGS. 1-9. For example, the method 200 may be performed using the components of the cable connector 10 described herein.

It will be appreciated that following description of method 200 is provided by way of example and is not meant to be limiting. Therefore, it is to be understood that method 200 may include additional and/or alternative steps relative to those illustrated in FIG. 10. Further, it is to be understood that the steps of method 200 may be performed in any suitable order. Further still, it is to be understood that one or more steps may be omitted from method 200 without departing from the scope of this disclosure. It will also be appreciated that method 200 also may be performed in other contexts using other suitable components.

With reference to FIG. 10, at 202 the method 200 includes inserting a plurality of alignment pins through a plurality of stiffener alignment apertures in a stiffener plate and a plurality of FPC alignment apertures in the FPC. At 206 the method 200 includes affixing the alignment pins to the stiffener plate. At 210 the method 200 may include riveting the alignment pins to the stiffener plate. At 214 the method 200 includes inserting the plurality of alignment pins into a plurality of PCB apertures in the PCB. At 218 the method 200 includes affixing two or more alignment pins of the plurality of alignment pins to the PCB. At 222 the method 200 may include soldering the two or more alignment pins to the PCB.

At 226 the method 200 may include bonding the stiffener plate to the FPC. At 230, where the cable connector comprises a first collar plate and a second collar plate opposite the first collar plate that enclose at least portions of a first ribbon and a second ribbon of the FPC that extend from the PCB, the method 200 includes soldering the first collar plate to the first ribbon of the FPC between a first leading edge and a first trailing edge of the first collar plate, and soldering the second collar plate to the second ribbon of the FPC between a second leading edge and a second trailing edge of the second collar plate.

The following paragraphs provide additional support for the claims of the subject application. One aspect provides A cable connector for attachment to a printed circuit board (PCB), the cable connector comprising: a flexible printed circuit (FPC) comprising a plurality of FPC alignment apertures; a stiffener plate comprising a plurality of stiffener alignment apertures; and a plurality of alignment pins extending through the plurality of stiffener alignment apertures and the plurality of FPC alignment apertures and into a plurality of PCB apertures in the PCB, wherein the plurality of alignment pins align the FPC to the PCB. The cable connector may additionally or alternatively include an adhesive layer that bonds the stiffener plate to the FPC. The cable connector may additionally or alternatively include, wherein each alignment pin of the plurality of alignment pins comprises a tail end that is riveted to the stiffener plate. The cable connector may additionally or alternatively include, wherein each alignment pin of the plurality of alignment pins comprises a standoff feature between a tail end and a head end of the alignment pin, wherein the standoff feature comprises an upper shoulder that engages a lower surface of the stiffener plate. The cable connector may additionally or alternatively include, wherein at least two alignment pins of the plurality of alignment pins comprise a head end that is soldered to the PCB to thereby attach the FPC to the PCB via the stiffener plate. The cable connector may additionally or alternatively include, wherein the plurality of PCB apertures in the PCB comprises at least two plated through-holes, and the head end of each alignment pin of the at least two alignment pins is soldered to one of the plated-through holes. The cable connector may additionally or alternatively include, wherein the plurality of FPC alignment apertures are at a distal end of the FPC, and the FPC comprises a first ribbon and an opposing second ribbon extending away from the distal end, wherein the first ribbon is affixed to a first bonding surface of a tongue of the cable connector and the second ribbon is affixed to a second bonding surface of the tongue opposite to the first bonding surface.

Another aspect provides cable connector for attachment to a printed circuit board (PCB), the cable connector comprising: a tongue comprising: a first tongue surface comprising: a plurality of first bonding surfaces extending from a proximal end of the tongue to a distal end of the tongue, the first bonding surfaces affixed to a first ribbon of a flexible printed circuit (FPC); and a plurality of first slots extending between the first bonding surfaces from the proximal end of the tongue to the distal end of the tongue; and a second tongue surface opposite the first tongue surface, the second tongue surface comprising: a plurality of second bonding surfaces extending from the proximal end of the tongue to the distal end of the tongue, the second bonding surfaces affixed to a second ribbon of the FPC; and a plurality of second slots extending between the second bonding surfaces from the proximal end of the tongue to the distal end of the tongue. The cable connector may additionally or alternatively include adhesive affixing the first bonding surfaces to the first ribbon of the FPC and affixing the second bonding surfaces to the second ribbon of the FPC, wherein the plurality of first slots and the plurality of second slots collect overflow adhesive. The cable connector may additionally or alternatively include, wherein the tongue comprises a first leading surface and opposing second leading surface at the proximal end, wherein a first contacting surface of the first ribbon of the FPC is below the first leading surface of the tongue, and a second contacting surface of the second ribbon of the FPC is below the second leading surface of the tongue. The cable connector may additionally or alternatively include, wherein the tongue comprises a first angled ramp extending between a nose of the tongue and the first leading surface, and a second angled ramp extending between the nose and the second leading surface. The cable connector may additionally or alternatively include a first collar plate and a second collar plate opposite the first collar plate, the first collar plate soldered to the first ribbon of the FPC between a first leading edge and a first trailing edge of the first collar plate, and the second collar plate soldered to the second ribbon of the FPC between a second leading edge and a second trailing edge of the second collar plate. The cable connector may additionally or alternatively include, wherein the tongue comprises a cavity between the first tongue surface and the second tongue surface, and the cable connector further comprises a midplate comprising: an insert plate that extends into the cavity; a first midplate wing extending laterally from the insert plate; and an opposing second midplate wing extending laterally from the insert plate. The cable connector may additionally or alternatively include: wherein the first collar plate comprises a first side collar wing extending laterally from a first side of the first collar plate and a second side collar wing extending laterally from a second side of the first collar plate; the second collar plate comprises a first side collar wing extending laterally from a first side of the second collar plate and a second side collar wing extending laterally from a second side of the second collar plate; and the first side collar wings of the first collar plate and the second collar plate are affixed to the first midplate wing of the midplate, and the second side collar wings of the first collar plate and the second collar plate are affixed to the second midplate wing of the midplate. The cable connector may additionally or alternatively include, wherein an internal thickness of the tongue between one of the first bonding surfaces and an opposing one of the second bonding surfaces is at least approximately 150 microns.

Another aspect provides method of attaching a flexible printed circuit (FPC) of a cable connector to a printed circuit board (PCB), the method comprising: inserting a plurality of alignment pins through a plurality of stiffener alignment apertures in a stiffener plate and a plurality of FPC alignment apertures in the FPC; affixing the alignment pins to the stiffener plate; inserting the plurality of alignment pins into a plurality of PCB apertures in the PCB; and affixing two or more alignment pins of the plurality of alignment pins to the PCB. The method may additionally or alternative include bonding the stiffener plate to the FPC. The method may additionally or alternative include, wherein affixing the two or more alignment pins to the PCB comprises soldering the two or more alignment pins to the PCB. The method may additionally or alternative include, wherein affixing the alignment pins to the stiffener plate comprises riveting the alignment pins to the stiffener plate. The method may additionally or alternative include, wherein the cable connector further comprises a first collar plate and a second collar plate opposite the first collar plate that enclose at least portions of a first ribbon and a second ribbon of the FPC that extend from the PCB, the method further comprising: soldering the first collar plate to the first ribbon of the FPC between a first leading edge and a first trailing edge of the first collar plate; and soldering the second collar plate to the second ribbon of the FPC between a second leading edge and a second trailing edge of the second collar plate.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A cable connector for attachment to a printed circuit board (PCB), the cable connector comprising:

a flexible printed circuit (FPC) comprising a plurality of FPC alignment apertures;

a stiffener plate comprising a plurality of stiffener alignment apertures; and a plurality of alignment pins extending through the plurality of stiffener alignment apertures and the plurality of FPC alignment apertures and into a plurality of PCB apertures in the PCB, wherein the plurality of alignment pins align the FPC to the PCB, wherein each alignment pin of the plurality of alignment pins comprises a standoff feature between a tail end and a head end of the alignment pin, wherein the standoff feature comprises an upper shoulder that engages a lower surface of the stiffener plate and a lower shoulder that engages the PCB.

2. The cable connector of claim 1, further comprising an adhesive layer that bonds the stiffener plate to the FPC.

3. The cable connector of claim 1, wherein each tail end of each of the alignment pins is riveted to the stiffener plate.

4. The cable connector of claim 1, wherein each head end of each of the alignment pins is soldered to the PCB to thereby attach the FPC to the PCB via the stiffener plate.

5. The cable connector of claim 4, wherein the plurality of PCB apertures in the PCB comprises at least two plated through-holes, and the head end of each alignment pin of the at least two alignment pins is soldered to one of the plated-through holes.

6. The cable connector of claim 1, wherein the plurality of FPC alignment apertures are at a distal end of the FPC, and the FPC comprises a first ribbon and an opposing second ribbon extending away from the distal end, wherein the first ribbon is affixed to a first bonding surface of a tongue of the cable connector and the second ribbon is affixed to a second bonding surface of the tongue opposite to the first bonding surface.

7. A cable connector for attachment to a printed circuit board (PCB), the cable connector comprising:

a tongue comprising:

a first tongue surface comprising:

a plurality of first bonding surfaces extending from a proximal end of the tongue to a distal end of the tongue, the first bonding surfaces adhesively affixed to a first ribbon of a flexible printed circuit (FPC) along the length of the tongue; and a plurality of first slots extending between the first bonding surfaces from the proximal end of the tongue to the distal end of the tongue; and a second tongue surface opposite the first tongue surface, the second tongue surface comprising:

a plurality of second bonding surfaces extending from the proximal end of the tongue to the distal end of the tongue, the second bonding surfaces adhesively affixed to a second ribbon of the FPC along the length of the tongue; and a plurality of second slots extending between the second bonding surfaces from the proximal end of the tongue to the distal end of the tongue.

8. The cable connector of claim 7, further comprising adhesive affixing the first bonding surfaces to the first ribbon of the FPC and affixing the second bonding surfaces to the second ribbon of the FPC, wherein the plurality of first slots and the plurality of second slots collect overflow adhesive.

9. The cable connector of claim 7, wherein the tongue comprises a first leading surface and opposing second leading surface at the proximal end, wherein a first contacting surface of the first ribbon of the FPC is below the first leading surface of the tongue, and a second contacting surface of the second ribbon of the FPC is below the second leading surface of the tongue.

10. The cable connector of claim 9, wherein the tongue comprises a first angled ramp extending between a nose of the tongue and the first leading surface, and a second angled ramp extending between the nose and the second leading surface.

11. The cable connector of claim 7, further comprising a first collar plate and a second collar plate opposite the first collar plate, the first collar plate soldered to the first ribbon of the FPC between a first leading edge and a first trailing edge of the first collar plate, and the second collar plate soldered to the second ribbon of the FPC between a second leading edge and a second trailing edge of the second collar plate.

12. The cable connector of claim 11, wherein the tongue comprises a cavity between the first tongue surface and the second tongue surface, and the cable connector further comprises a midplate comprising:

an insert plate that extends into the cavity;

a first midplate wing extending laterally from the insert plate; and an opposing second midplate wing extending laterally from the insert plate.

13. The cable connector of claim 12, further comprising:

wherein the first collar plate comprises a first side collar wing extending laterally from a first side of the first collar plate and a second side collar wing extending laterally from a second side of the first collar plate;

the second collar plate comprises a first side collar wing extending laterally from a first side of the second collar plate and a second side collar wing extending laterally from a second side of the second collar plate; and the first side collar wings of the first collar plate and the second collar plate are affixed to the first midplate wing of the midplate, and the second side collar wings of the first collar plate and the second collar plate are affixed to the second midplate wing of the midplate.

14. The cable connector of claim 7, wherein an internal thickness of the tongue between one of the first bonding surfaces and an opposing one of the second bonding surfaces is at least approximately 150 microns.

15. A method of attaching a flexible printed circuit (FPC) of a cable connector to a printed circuit board (PCB), the method comprising:

inserting a plurality of alignment pins through a plurality of stiffener alignment apertures in a stiffener plate and a plurality of FPC alignment apertures in the FPC, wherein each alignment pin of the plurality of alignment pins comprises a standoff feature between a tail end and a head end of the alignment pin, wherein the standoff feature comprises an upper shoulder that engages a lower surface of the stiffener plate and a lower shoulder that engages the PCB;

affixing the alignment pins to the stiffener plate;

inserting the plurality of alignment pins into a plurality of PCB apertures in the PCB; and affixing two or more alignment pins of the plurality of alignment pins to the PCB.

16. The method of claim 15, further comprising bonding the stiffener plate to the FPC.

17. The method of claim 15, wherein affixing the two or more alignment pins to the PCB comprises soldering the two or more alignment pins to the PCB.

18. The method of claim 15, wherein affixing the alignment pins to the stiffener plate comprises riveting the alignment pins to the stiffener plate.

19. The method of claim 15, wherein the cable connector further comprises a first collar plate and a second collar plate opposite the first collar plate that enclose at least portions of a first ribbon and a second ribbon of the FPC that extend from the PCB, the method further comprising:

soldering the first collar plate to the first ribbon of the FPC between a first leading edge and a first trailing edge of the first collar plate; and soldering the second collar plate to the second ribbon of the FPC between a second leading edge and a second trailing edge of the second collar plate.

20. The method of claim 19, wherein the plurality of FPC alignment apertures are at a distal end of the FPC, and the first ribbon and the second ribbon extend away from the distal end, the method further comprising:

affixing the first ribbon to a first bonding surface of a tongue of the cable connector; and affixing the second ribbon to a second bonding surface of the tongue opposite to the first bonding surface.

* * * * *